United States Patent
Li et al.

(10) Patent No.: US 7,357,558 B2
(45) Date of Patent: Apr. 15, 2008

(54) LCD DISPLAY BACKLIGHT SYSTEM WITH IMPROVED COLOR MIXING AND EFFICIENCY

(75) Inventors: Kenneth K. Li, Castaic, CA (US); Seiji Inatsugu, Santa Monica, CA (US)

(73) Assignee: Wavien, Inc., Valencia, CA (US)

( * ) Notice: Subject to any disclaimer, the term of this patent is extended or adjusted under 35 U.S.C. 154(b) by 0 days.

(21) Appl. No.: 11/516,939

(22) Filed: Sep. 6, 2006

(65) Prior Publication Data

US 2007/0053178 A1 Mar. 8, 2007

Related U.S. Application Data

(60) Provisional application No. 60/796,727, filed on May 2, 2006, provisional application No. 60/789,225, filed on Apr. 4, 2006, provisional application No. 60/714,474, filed on Sep. 6, 2005.

(51) Int. Cl.
*F21V 7/04* (2006.01)
(52) U.S. Cl. ............... 362/624; 362/609; 362/625; 359/454
(58) Field of Classification Search ............... 362/97, 362/609, 612, 623, 624, 625; 353/20, 77; 349/9; 359/453, 454, 460
See application file for complete search history.

(56) References Cited

U.S. PATENT DOCUMENTS

2006/0125716 A1* 6/2006 Wong et al. ............ 345/46

* cited by examiner

*Primary Examiner*—John Anthony Ward
(74) *Attorney, Agent, or Firm*—Fulbright & Jaworski LLP (57) ABSTRACT

A LCD display backlight system with improved color mixing and efficiency comprises a reflective surface, a plurality of light sources mounted on the reflective surface, a plurality of fractional wave plates and a reflective polarizer. The plurality of fractional wave plates is mounted on spaces between the plurality of light sources on the reflective surface. The reflective polarizer transmits light having a useable polarization and reflects back unused polarization of light onto the reflective surface. A portion of the unused polarization of light reflected from the reflective polarizer passes through a fractional wave plate. The reflective surface reflects the portion of the unused polarization of light through the fractional wave plate such that the polarization of the unused polarization of light is changed to useable polarization, thereby recycling the unused polarization of light into useful light.

28 Claims, 10 Drawing Sheets

Figure 9

LCD DISPLAY BACKLIGHT SYSTEM WITH IMPROVED COLOR MIXING AND EFFICIENCY

RELATED APPLICATIONS

This application claims the benefit of U.S. Provisional application Ser. Nos. 60/714,474 filed Sep. 6, 2005, 60/789,225, filed Apr. 4, 2006 and 60/796,727, filed May 2, 2006, each of which is incorporated herein by reference in its entirety.

FIELD OF THE INVENTION

The present invention relates to a LCD display backlight system, particularly a LCD display backlight system with improved color mixing and efficiency.

BACKGROUND OF THE INVENTION

Figure 1:
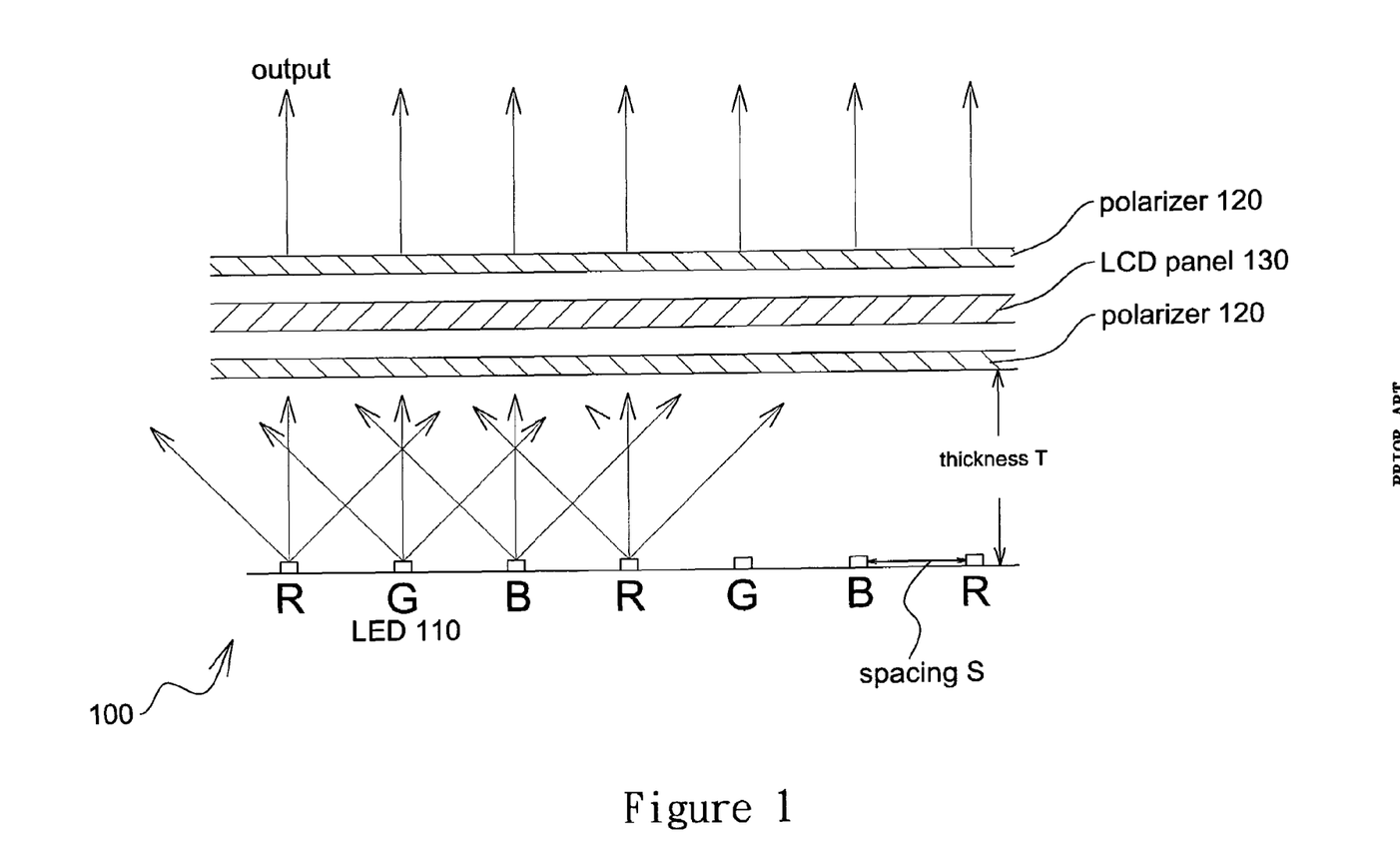
FIG. 1 is a schematic diagram of a typical LCD display backlight system.

An ideal LCD backlight system should have high efficiency and uniform intensity profile. A typical application of colored LED in backlighting of LCD is shown in FIG. 1. The LCD backlight system 100 includes a plurality of LEDs 110, polarizers 120 and LCD panels 130. The LEDs 110, labeled as R, G, and B, representing the 3 primary colors of red, green, and blue, respectively, are placed at a certain spacing S apart. The LCD system 100 is also placed at a thickness T away from the LEDs 110. In this case, the efficiency is limited by the polarizer, in which, more than half of the absorbed light is of the wrong polarization. The uniformity is dependent on the spacing of the LEDs and the thickness. The thicker the LCD system 100 and the narrower the spacing S, the emission from the various colored LEDs 110 will overlap more. Thereby requiring a high density LED population and thick display to achieve a uniform display with the typical LCD backlight system 100. High density of LED population and thick display are both undesirable in practical application of LCD display backlight system.

Accordingly, the present invention proceeds upon desirability of providing LCD display backlighting system with high efficiency and uniform intensity profile using less LEDs than typical LCD display backlight system by recycling polarized light, reducing the thickness of the display and increasing the spacing of the LEDs.

SUMMARY OF THE INVENTION

In accordance with an embodiment of the present invention, the LCD display backlight system utilizes a reflective polarizer to feedback the unused polarization of light into a light source and recycle it as useful light. The present invention also utilizes fractional wave-plates allowing selective rotation of polarization providing virtual sources of light between the LEDs, thus allowing larger spacing between the LEDs.

In accordance with an embodiment of the present invention, the LCD display backlight system with improved color mixing and efficiency comprises a reflective surface, a plurality of light sources mounted on the reflective surface, a plurality of fractional wave plates and a reflective polarizer. The plurality of fractional wave plates are mounted on spaces between the plurality of light sources on the reflective surface. The reflective polarizer transmits light having a useable polarization and reflects back unused polarization of light onto the reflective surface. A portion of the unused polarization of light reflected from the reflective polarizer passes through a fractional wave plate. The reflective surface reflects the portion of the unused polarization of light through the fractional wave plate such that the polarization of the unused polarization of light is changed to useable polarization, thereby recycling the unused polarization of light into useful light.

In accordance with an embodiment of the present invention, the LCD display backlight system with improved color mixing and efficiency comprises a reflective surface, a plurality of light sources mounted on the reflective surface, a plurality of fractional wave plates and a reflective polarizer. The plurality of fractional wave plates are located between the reflective polarizer and the reflective surface. The reflective polarizer transmits light having a useable polarization and reflects back unused polarization of light onto the reflective surface. A portion of the unused polarization of light reflected from the reflective polarizer passes through a fractional wave plate. The reflective surface reflects the portion of the unused polarization of light through the fractional wave plate such that the polarization of the unused polarization of light is changed to useable polarization, thereby recycling the unused polarization of light into useful light.

Various other objects, advantages and features of the present invention will become readily apparent from the ensuing detailed description, and the novel features will be particularly pointed out in the appended claims.

DESCRIPTION OF THE DRAWINGS

The following detailed description, given by way of example, and not intended to limit the present invention solely thereto, will best be understood in conjunction with the accompanying drawings in which like components or features in the various figures are represented by like reference numbers.

DETAILED DESCRIPTION OF EXEMPLARY EMBODIMENTS

With reference to the figures, exemplary embodiments of the invention are now described. These embodiments illustrate principles of the invention and should not be construed as limiting the scope of the invention.

Figure 2:
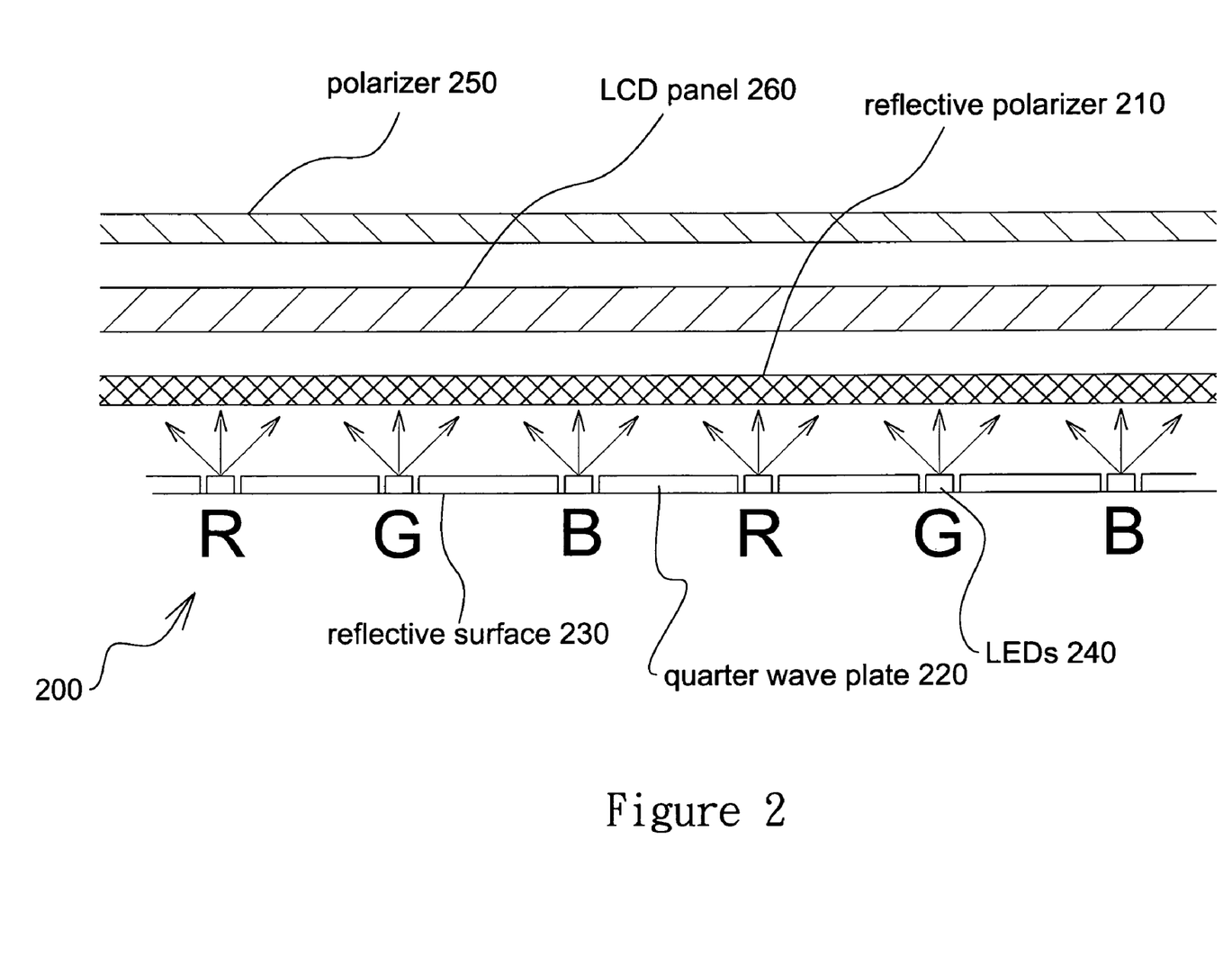
FIG. 2 is a schematic diagram of a LCD display backlight system with improved color mixing and efficiency in accordance with an exemplary embodiment of the present invention.

In accordance with an exemplary embodiment of the present invention, the LCD display system backlight system 20 comprises a plurality of LEDs 240, a polarizer 250, a LCD panel 260, a reflective polarizer 210 and a plurality of fractional wave plates 220 (preferably quarter wave plates) on a reflective surface 230. The LEDs comprises of one or more colors with 3 colors, R, G, and B. used commonly. Four or Five colors are also used for improved color performance. Larger number of colors can also be used to produce better colors on the screen, but may introduce extra cost. The reflective polarizer 210 reflects back the unused polarization of light into the mounting surface (i.e., the reflective surface 230) of the LEDs 240. The space between the LEDs 240 are covered with the fractional wave plates 220 on the reflective surface 230. The unused polarization of light passes through a fractional wave plate 220 (preferably a quarter wave plate) and reflected by the reflective surface 230. Thereafter the reflected light passes through the fractional wave plate 220 again, thereby completing a total half wave passage through the fractional wave plate 220 and effectively changing the polarization state of the reflected light. The polarization of the unused light is now suitable for transmission through the reflective polarizer 210, thereby advantageously providing additional output of light to the LCD panel 260.

Figure 3:
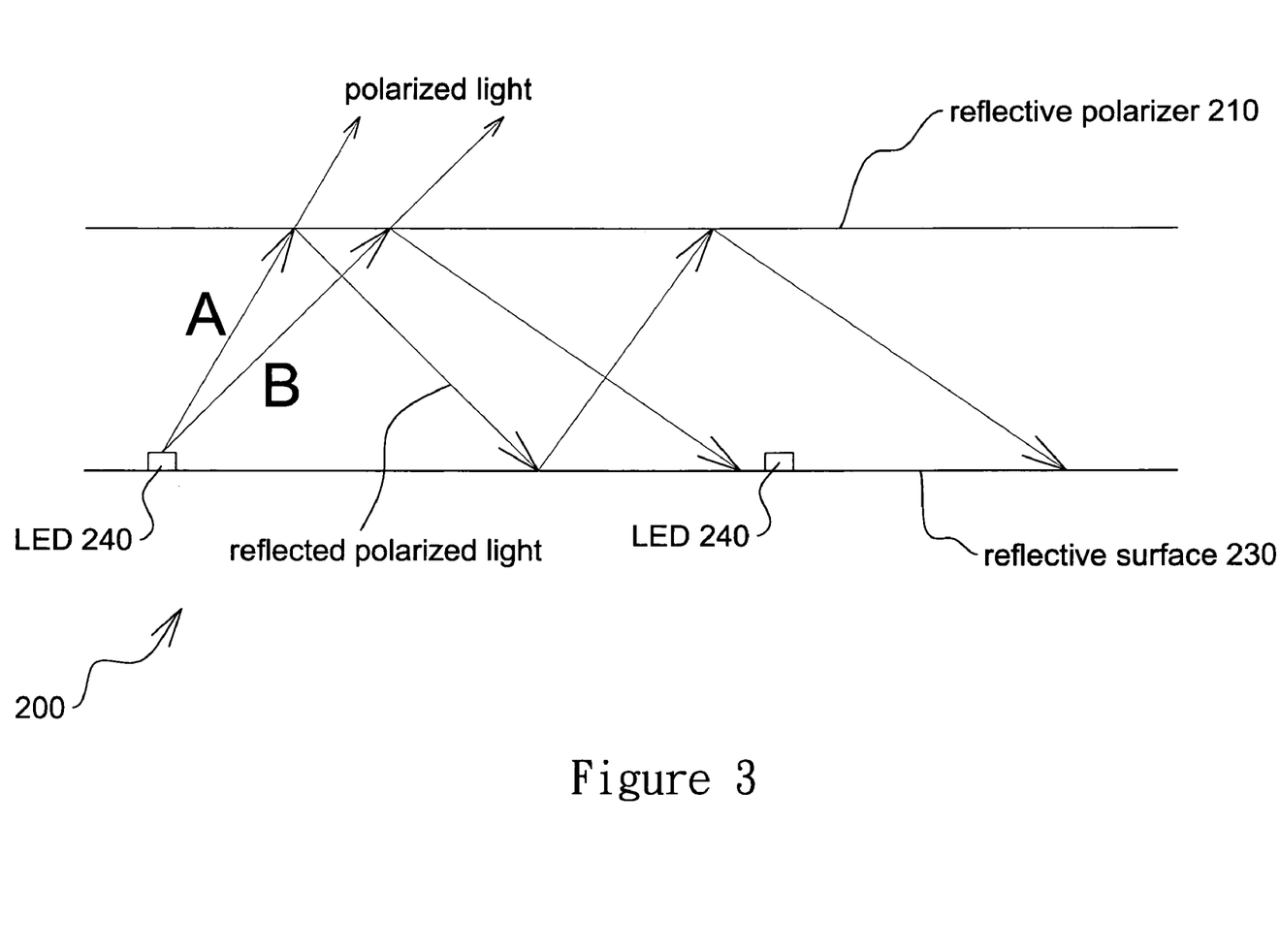
FIG. 3 is a schematic diagram of a LCD display backlight system with improved color mixing and efficiency in accordance with an exemplary embodiment of the present invention.

Although the utilization of the reflective polarizer 210 increases the efficiency of the LCD display backlight system 200, it is appreciated that if the spacing S between the LEDs 240 is far apart, the intensity profile will be non-uniform. Hence, in accordance with an exemplary embodiment of the present invention, the LCD display backlight system 200 of FIG. 3 is designed or constructed such that the light from one LED 240 is made to propagate longer or farther before it can exist from the reflective polarizer 210, thereby providing the LCD display backlight system 200 with improved color mixing capability or function. The LCD display backlight system 200 shown in FIG. 3 in accordance with an exemplary embodiment of the present invention is similar to FIG. 2, except the fractional wave plate 220 is not utilized. That is, the fractional wave plate 220 is removed from the reflective surface 230 of the LCD display backlight system 200 of FIG. 2. The unused light remains in the same polarization state after reflection and is continuously reflected by the reflective polarizer 210 and the reflective surface 230 such that the light is trapped between these two surfaces 210, 230.

Figure 4:
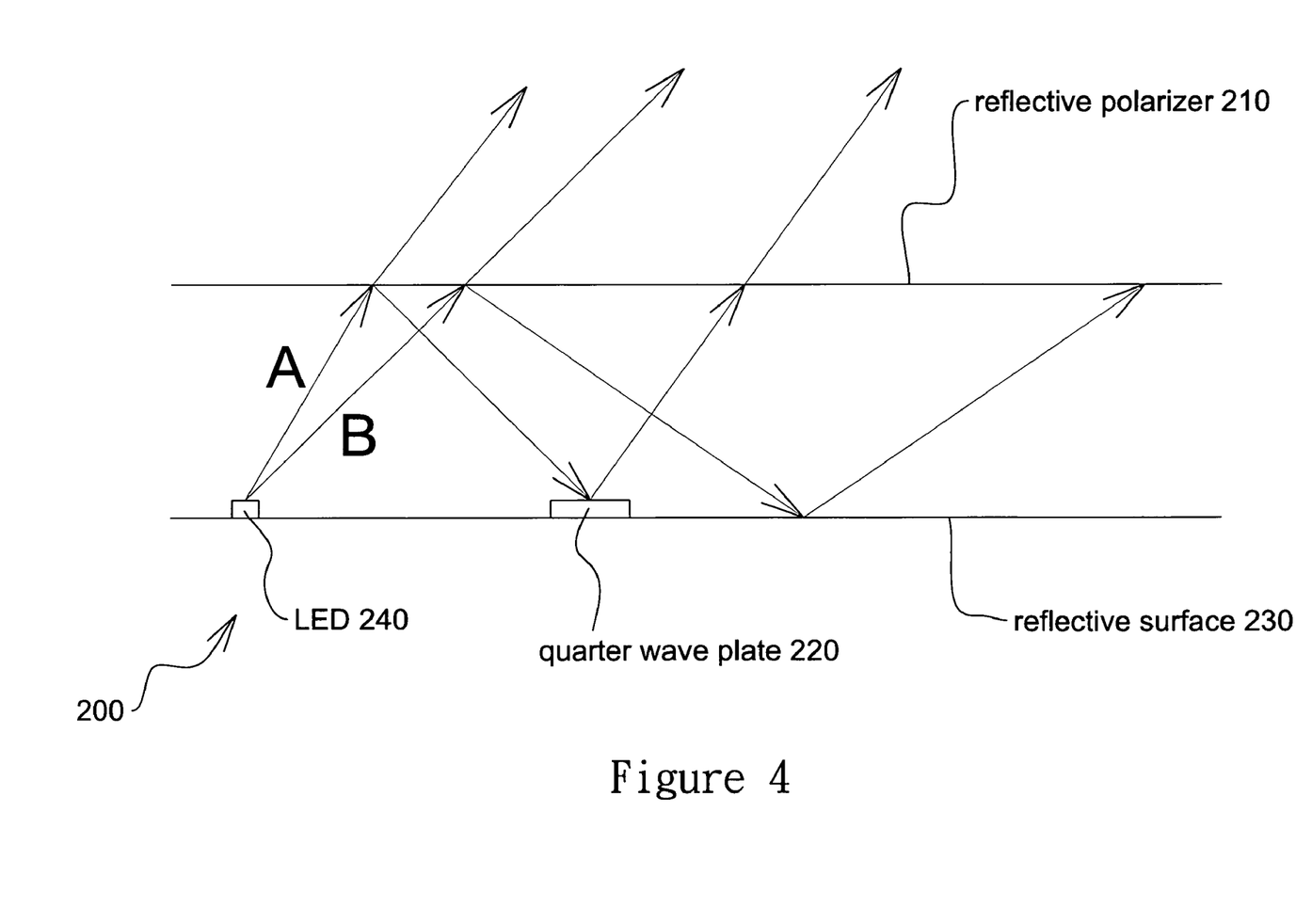
FIG. 4 is a schematic diagram of a LCD display backlight system with improved color mixing and efficiency in accordance with an exemplary embodiment of the present invention.

In accordance with an exemplary embodiment of the present invention, the LCD display backlight system 200 in FIG. 4 comprises a plurality of fractional wave plates 220 covering only part of the reflective surface 230. It is appreciated that a portion of the light, indicated as ray A in FIG. 4, impinging onto the fractional wave plate 220 will transmit through the reflective polarizer 210. The rest of the light, indicated as ray B, will be trapped and continue to propagate between these two surfaces. The light, ray B, may or may not hit the fractional wave plate 220 in its second reflection. This process will continue until all the light passes through the reflective polarizer 210 as useful light, where some light pass through in one reflection and others after many reflections, which is further away from the LED chip 240. This advantageously provides better color mixing, thereby increasing the efficiency and improving the uniformity of the LCD display backlight system 200 of FIG. 4.

Although not shown, it is appreciated that the LCD display backlight system 200 of the present invention can additionally comprise diffuser plates, prism films, etc. are commonly used in typical LCD display backlight system to further increase the uniformity of the intensity profile and control the angle of light exiting the LCD panel 260.

In accordance with an embodiment of the present invention, the LEDs 240 can be in chip form, or mounted and molded in lenses. In accordance with an aspect of the present invention, the spacing S of the LEDs 240 is dependent on the output from each LED 240. The higher the LED 240 output is, the larger the spacing S. The current development trend is that the output of each LED 240 is increasing as technology advances. As a result, the spacing S is expected to increase so as to reduce cost of the present invention, thereby making the present invention even more practical and applicable.

In accordance with an exemplary embodiment of the present invention, the reflective polarizer 210 can also be integrated with a diffuser. One example of such film is the DRPF (Diffused Reflective Polarizer Film) made by 3M. There are several other types of films with the same function but with some variations that are also available from 3M.

Although the various embodiments of the present invention is described using LEDs 240, the present invention can also utilize other light sources, e.g. cold cathode fluorescent lamps.

In accordance with an exemplary embodiment of the present invention, the coverage of the reflective surface 230 by the fractional wave plates 220 can be patterned as stripes, circles (rings centered around the LED 240, or dots), squares, rectangles, or any other geometric shapes. The pattern can also be random shapes, or regular shapes distributed randomly on the reflective surface 230. It is appreciated that the density and coverage percentage of the reflective surface 230 determines the amount of color mixing and can be optimized based on the thickness T and spacing S of the LCD display backlight system 200 of the present invention. The angular distribution of the light emission from the LEDs 240 is also another parameter to be considered in designing the LCD display backlight system 200 of the present invention. Since each reflection in the LCD display backlight system 200 of the present invention incur losses, the LCD display backlight system should be optimized based on trade-off between efficiency and uniformity.

In accordance with an exemplary embodiment of the present invention, the fractional wave plate 220 in FIG. 2 can be a quarter wave plate, a half wave plate or a wave plate of with other fraction of waves such that the output of a single pass through the wave plate 220 is not circular. The output from the second pass through the wave plate 220 after reflection is not orthogonal to the incidence of the light. As a result, the light subsequently hitting the reflective polarizer 210 does not match the polarization of the reflective polarizer 210 and results in only partial transmission. Hence, the partial reflected light propagates between the two surfaces 210, 230 and the process is repeated. Accordingly, the light exhibits or undergoes multiple reflections as it propagates between the two surfaces 210, 230 and the light exiting the reflective polarizer 210 being dependent on the fraction of wave in the wave plate 220. The net effect is that the LCD display backlight system 200 of the present invention enhances the distribution of the light from each light source 240.

In accordance with an exemplary embodiment of the present invention, the fractional wave plate 220 in FIGS. 2 and 4 is not aligned or does not match the direction of the polarization of the reflective polarizer 210 such that the light reflected from the fractional wave plate 220 is not orthogonal to the incident wave. As noted herein, the incident wave or light hitting the reflective polarizer 210 does not match the polarization of the reflective polarizer 210 and results in only partial transmission. Hence, the partial reflected light propagates between the two surfaces 210, 230 and the process is repeated. Accordingly, the light exhibits or undergoes multiple reflections as it propagates between the two surfaces 210, 230. The net effect is that the LCD display backlight system 200 of the present invention enhances the distribution of the light from each light source 240.

Figure 5A:
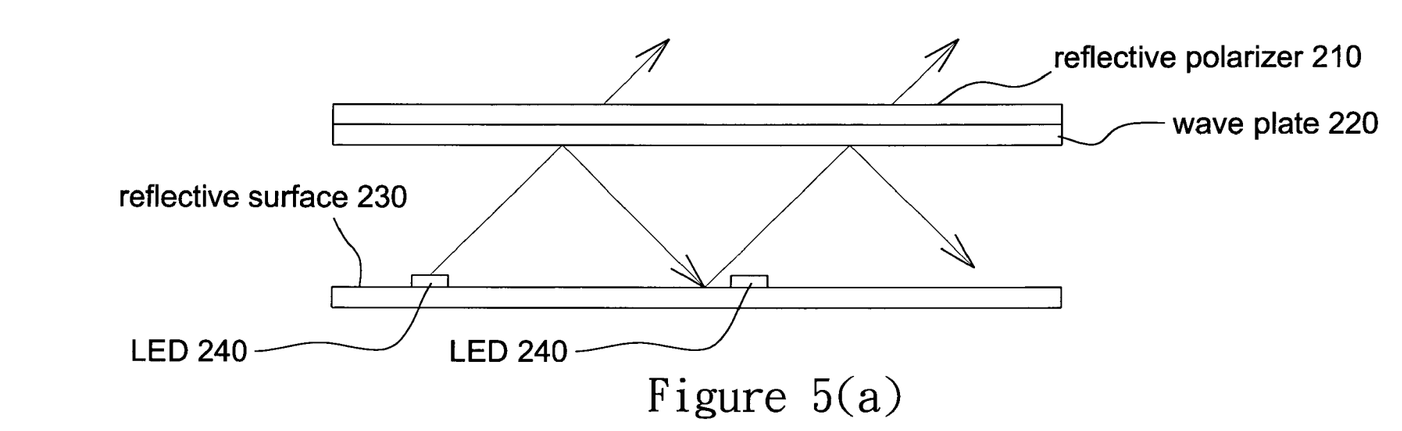
FIGS. 5(a)-(b) are schematic diagrams of a LCD display backlight system with the wave plates attached to the reflective polarizer in accordance with an exemplary embodiment of the present invention.
Figure 5B:
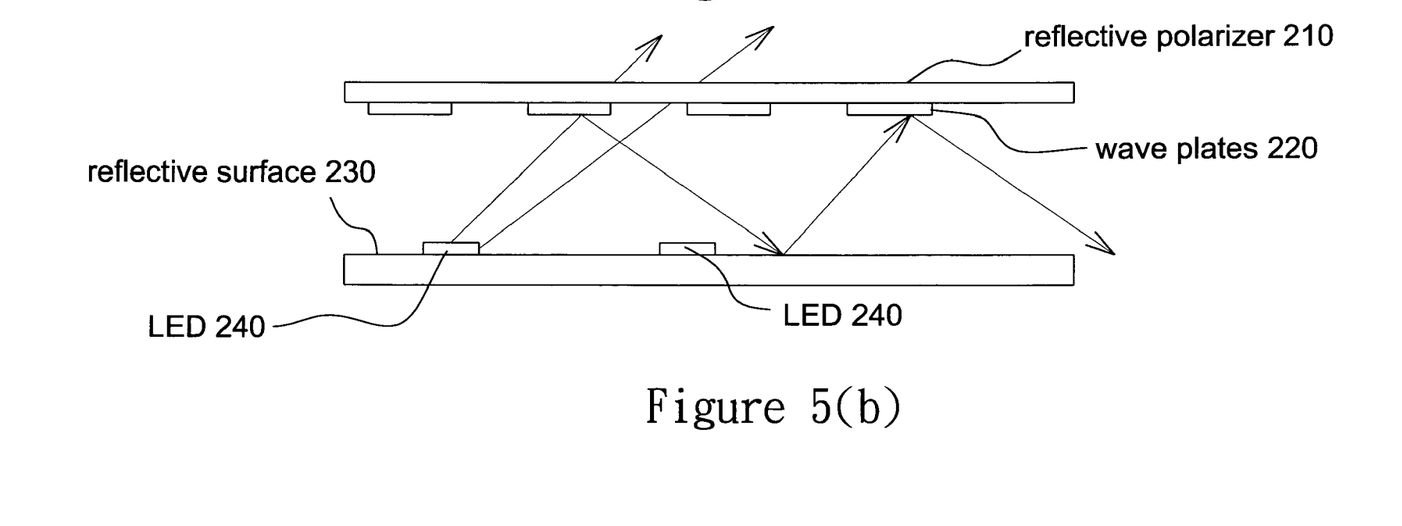

In accordance with an exemplary embodiment of the present invention, the fractional wave plate 220 in FIGS. 2 and 4 and wave plates in general are not attached to the bottom reflective surface 230, but rather somewhere in between the quarter wave plate 220 and the reflective surface 230. In accordance with an aspect of the present invention, if the wave plates 220 are attached to the reflective polarizer 210, the amount and orientation can be pre-fabricated onto the reflective polarizer 210 such that the intensity profile can be adjusted. This can advantageously simplify the assembly of the illumination system of the LCD display backlight system 200, as shown in FIGS. 5(a)-(b).

It is appreciated the fractional wave plates 220 can be quarter, half, or other fractions of multiples of waves. The reflective surface 230 can be fully covered or partially covered with the wave plates 220 to maximize the uniformity of the intensity profile.

Figure 6:
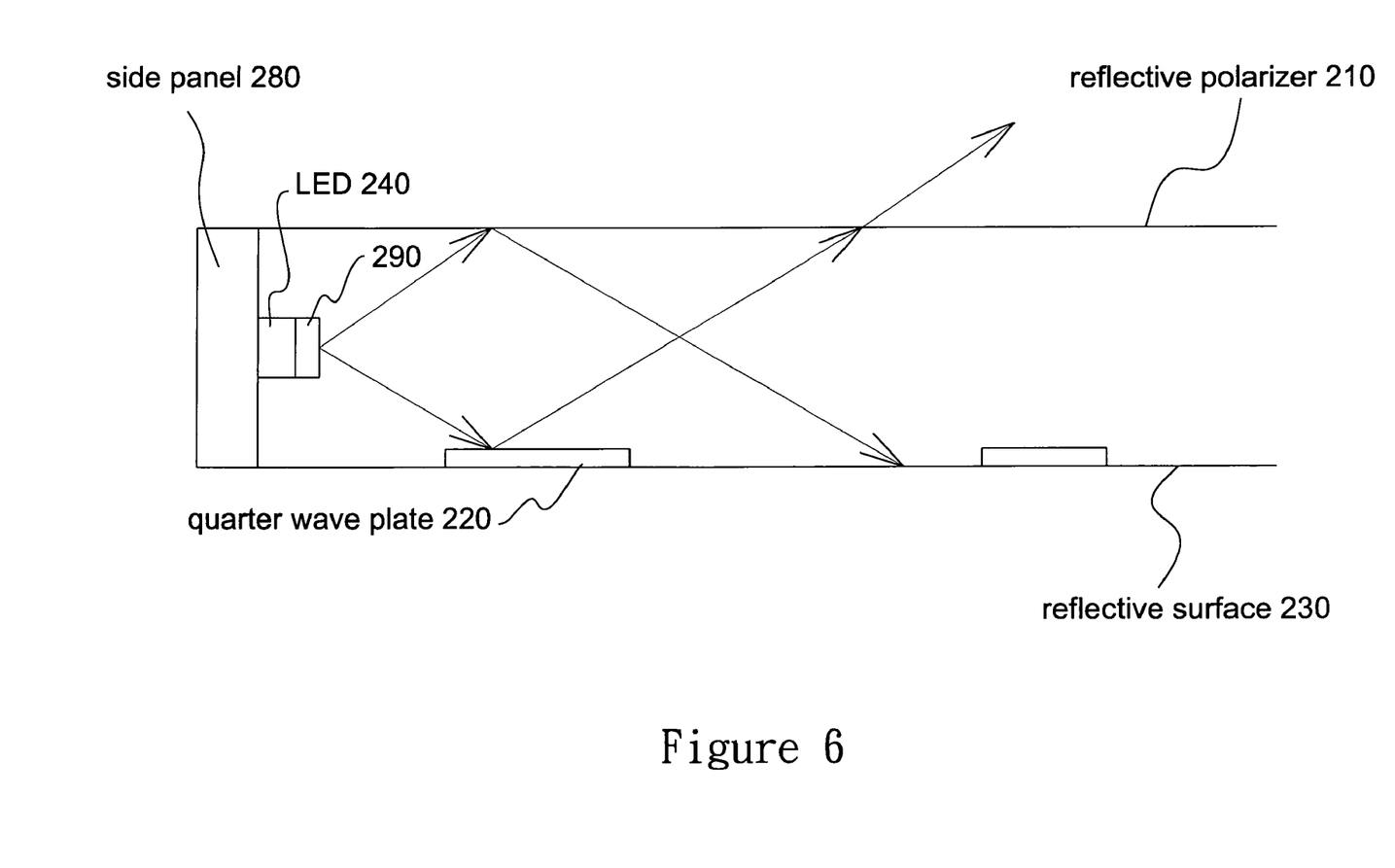
FIG. 6 is a schematic diagram of a LCD display backlight system with side panels in accordance with an exemplary embodiment of the present invention.
Figure 7:
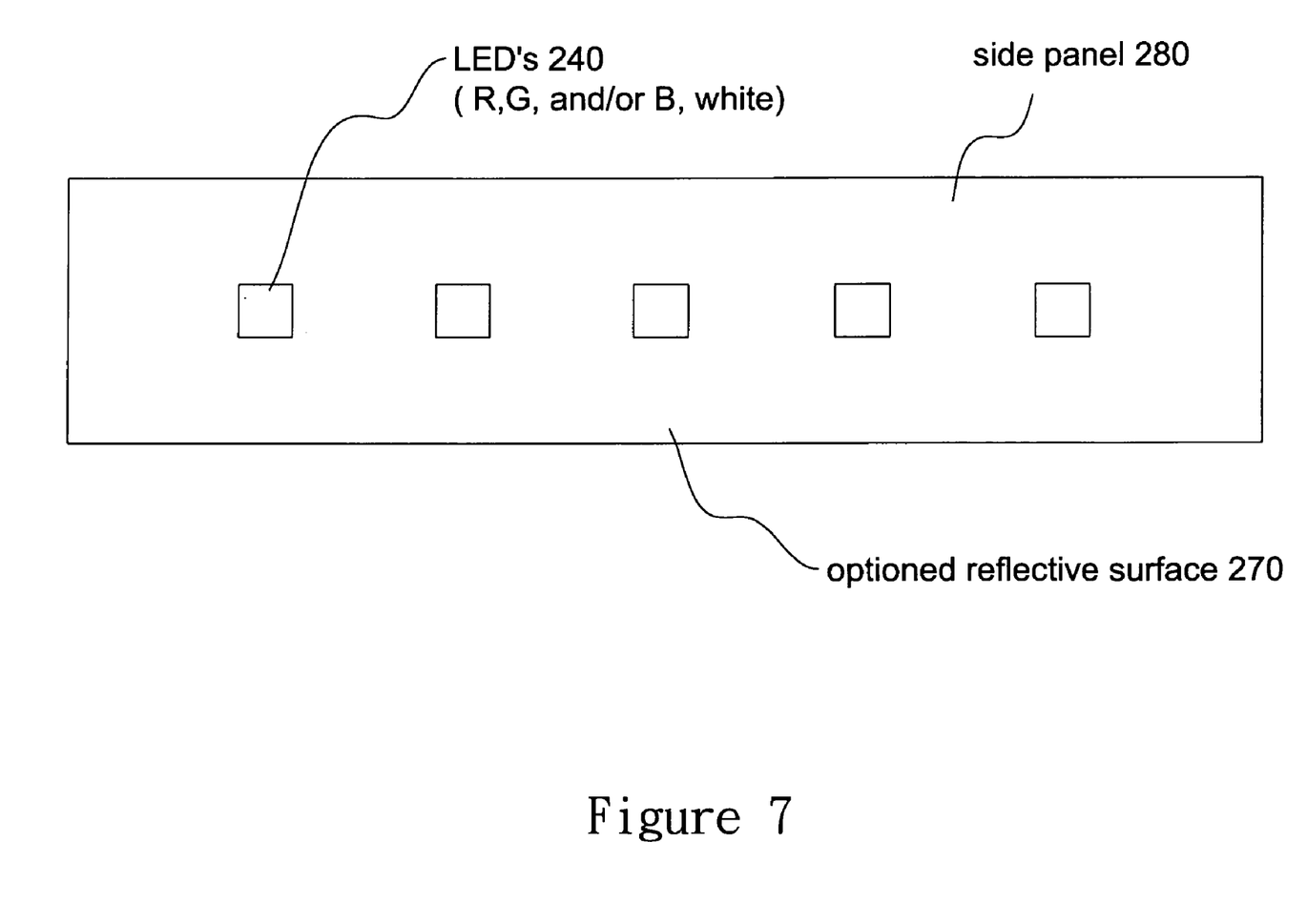
FIGS. 7 is a schematic diagram of the side panel in accordance with an exemplary embodiment of the present invention.

The various embodiments of the LCD display backlight system 200 of the present invention describe placing the LEDs 240 on the same parallel plane as the LCD panel 260. It is appreciated that the present mechanism of making the screen more uniform can be applied to edge illumination also. As shown in FIG. 6, in accordance with an exemplary embodiment of the present invention, the LEDs 240 are placed at edge of the display between the reflective polarizer 210 and the bottom reflective surface 230. The light is guided between the two planes (or surfaces) and extracted by use of the wave plates 220 in the manner described herein. The LEDs 240 are mounted in an array as shown in FIG. 7. The LEDs 240 can be red, green, blue, white or any other appropriate color, and can also contain more than 3 colors. In accordance with an aspect of the present invention, the LCD display backlight system 200 comprises an optional reflective surface 270, the space not occupied by the LEDs 240 is made reflective in FIG. 7, to increase the efficiency of the LCD display backlight system 200.

Figure 8:
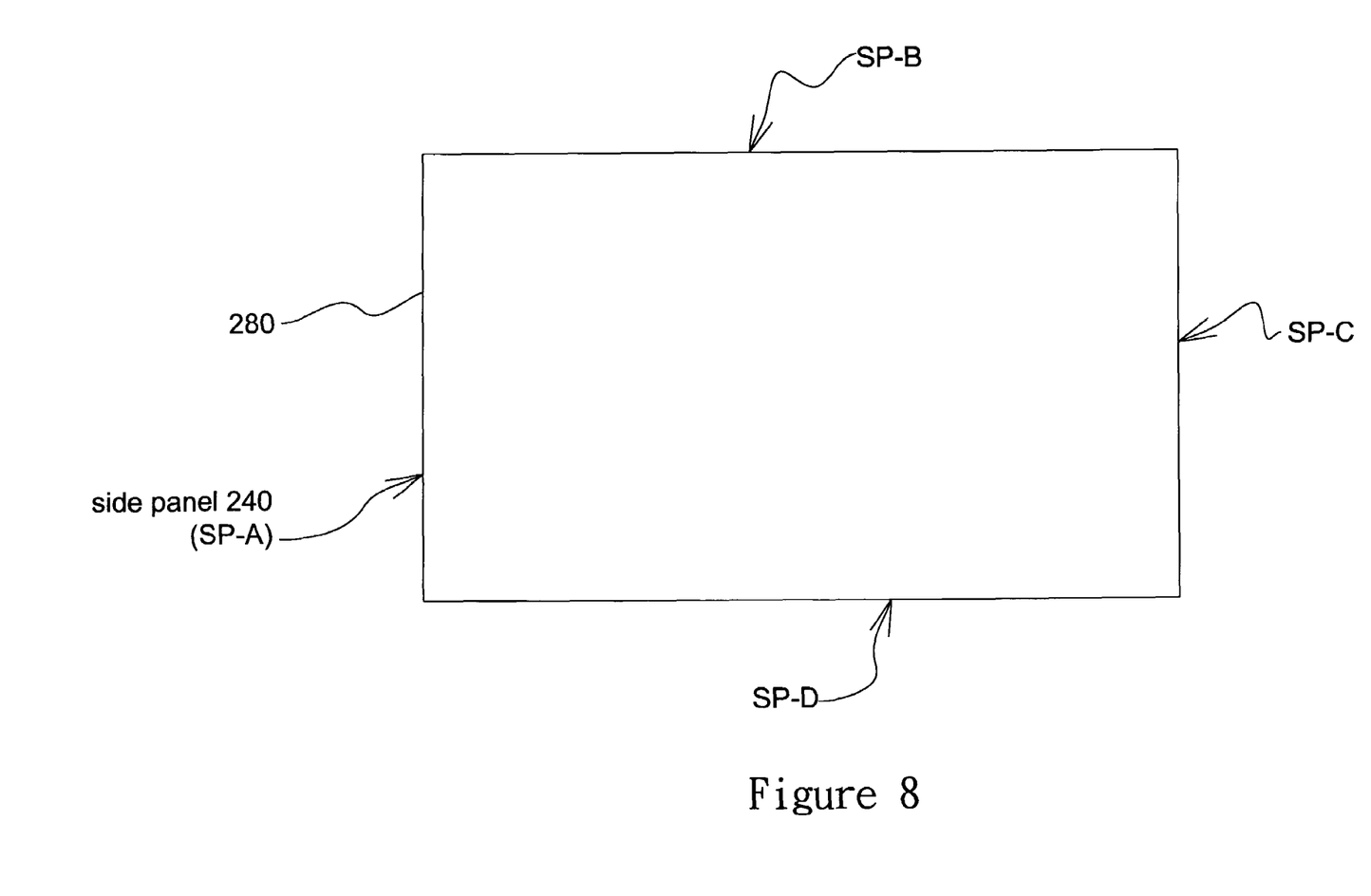
FIG. 8 is a schematic diagram of the LCD display panel with four side panels in accordance with an exemplary embodiment of the present invention.

In accordance with an embodiment of the present invention, the side panels 280 (labeled as SP-A, SP-B, SP-C and SP-D in FIG. 8) are placed on all four sides of the LCD panel or display 260. Depending on the amount of illumination needed by the LCD display backlight system 200, one or more side panels 280 can comprise LEDs 240 or an array of LEDs 240 to provide illumination from one or more sides of the LCD panel or display 260. Each remaining side panels 280 can comprise either a reflective, absorptive or partially reflective surface without any LED 240.

In accordance with an exemplary embodiment of the present invention, the LED arrays 240 can be replaced with cold cathode fluorescent lamps (CCFL). In accordance with an aspect of the present invention, one or more of the side panels 280 can comprise CCFL 240 such that the LCD panel 260 is illuminated with the combination of LED 240 and CCFL 240. It is appreciated that the color choices of the LED 240 an be determined by the desired color spectrum.

In accordance with an exemplary embodiment of the present invention, the LEDs 240 or CCFL 240 in the side panels 280 can emit un-polarized or polarized light. In the case of the polarized light emission, the LCD display backlight system 200 of the present invention can comprise polarization plates 290. For more efficient polarization, the LCD display polarization system 200 of the present invention can comprise a recovery system or polarization recycling system.

Figure 9:
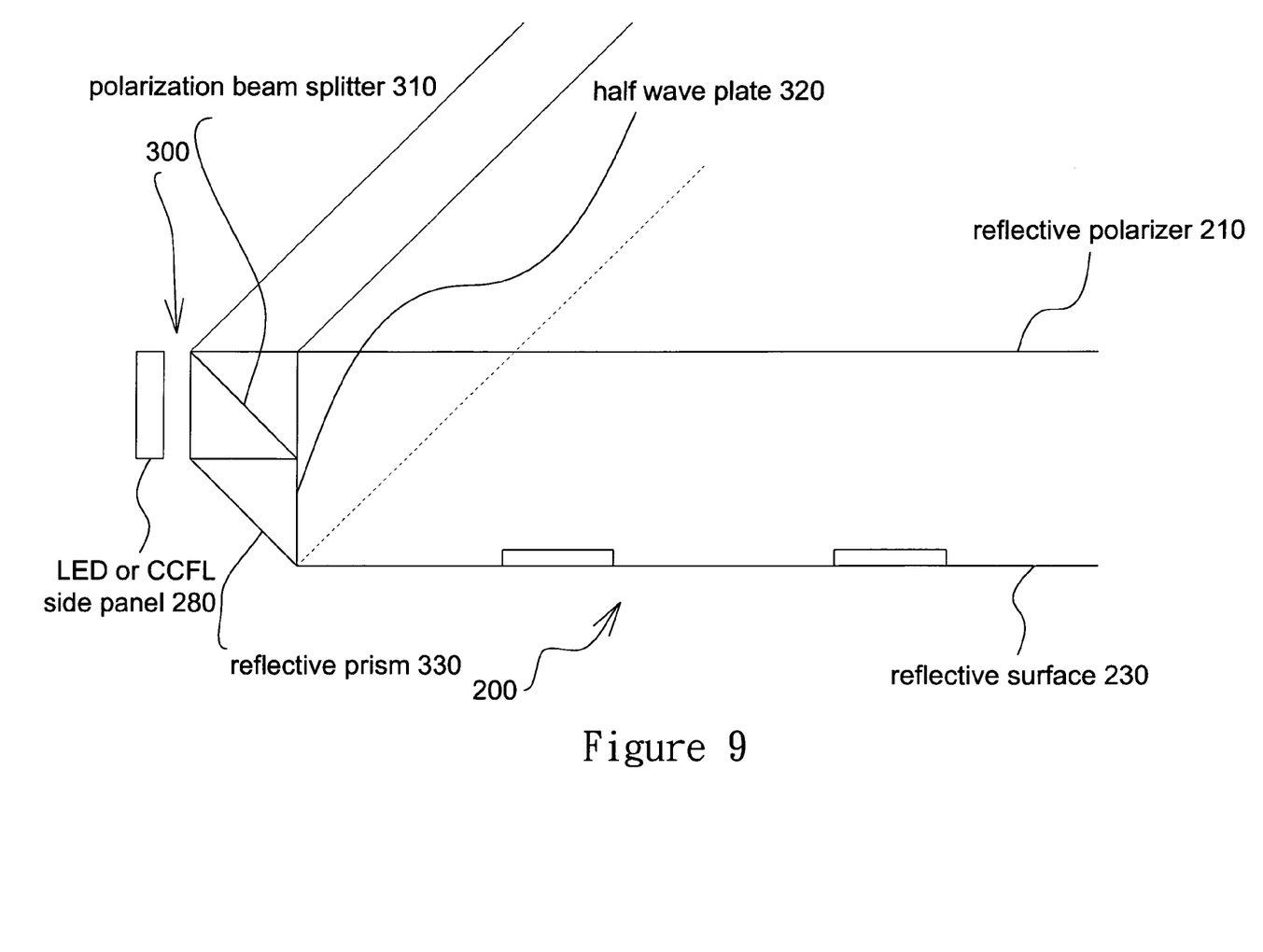
FIG. 9 is a schematic diagram of the polarization recovery system in accordance with an exemplary embodiment of the present invention.

In accordance with an exemplary embodiment of the present invention, the polarization recovery system 300 shown in FIG. 9 comprises a polarization beam splitter 310 and a half-wave plate 320. In accordance with an aspect of the present invention, the side panel 280 can comprises the polarization recovery system 300, which provides polarized light output from the LEDs 240 or CCFL 240.

Figure 10:
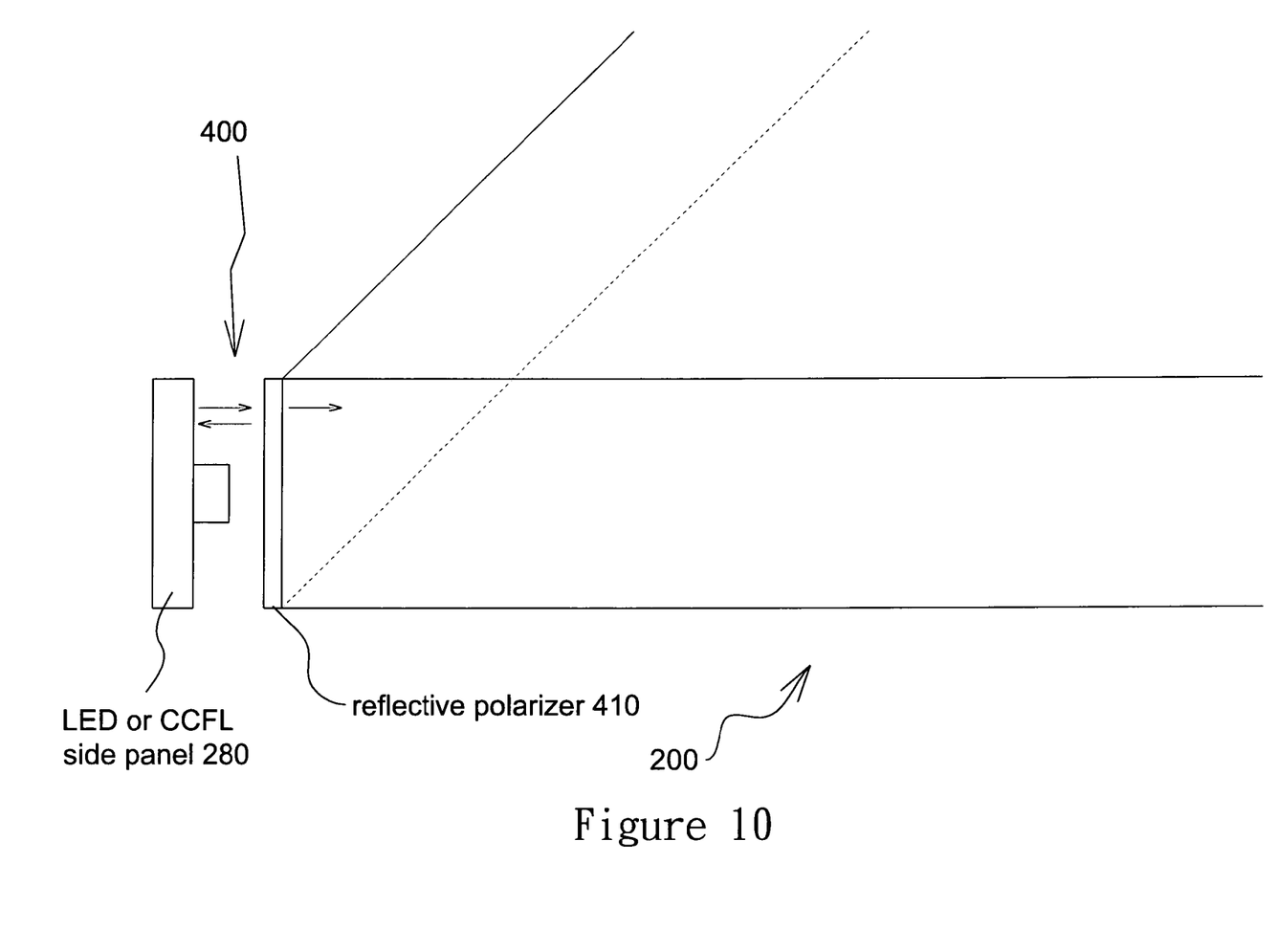
FIG. 10 is schematic diagram of the polarization recycling system in accordance with an exemplary embodiment of the present invention.

In accordance with an exemplary embodiment of the present invention, the polarization recycling system 400 shown in FIG. 10 comprises a reflective polarizer 410 to reflect part of the light back into the side panel 280 comprising LEDs 240 or CCFL 240 (i.e., the LED or CCFL side panel). The return light is reflected back to the output direction by the optional reflective surface 420 of the side panel 280, thus increasing the efficiency of the polarization recycling system 400 of the present invention.

The invention, having been described, it will be apparent to those skilled in the art that the same may be varied in many ways without departing from the spirit and scope of the invention. Any and all such modifications are intended to be included within the scope of the following claims.

What is claimed is:

1. A LCD display backlight system, comprising:
    a reflective surface;
    a plurality of light sources mounted on said reflective surface;
    a plurality of fractional wave plates mounted on spaces between said plurality of light sources on said reflective surface; and
    a reflective polarizer for transmitting light having a useable polarization and reflecting back unused polarization of light onto said reflective surface; and
    wherein a portion of said unused polarization of light reflected from said reflective polarizer passes through a fractional wave plate and said reflective surface reflects said portion of said unused polarization of light through said fractional wave plate such that the polarization of said unused polarization of light is changed to useable polarization, thereby recycling said unused polarization of light into useful light.

2. The LCD display backlight system of claim 1, wherein said plurality of light sources are LEDs.

3. The LCD display backlight system of claim 2, wherein said plurality of LEDs are in chip form.

4. The LCD display backlight system of claim 2, wherein said plurality of LEDs are mounted and molded in lenses.

5. The LCD display backlight system of claim 2, wherein each of said plurality of LEDs generates either red, green or blue light.

6. The LCD display backlight system of claim 5, wherein said portion of unused polarization of light from a LED is reflected one or more times before passing through said fractional wave plate, thereby mixing the colors of light from said plurality of LEDs.

7. The LCD display backlight system of claim 1, further comprising a LCD panel; and wherein said reflective polarizer transmits said light having useable polarization to said LCD panel.

8. The LCD display backlight system of claim 1, wherein said unused polarization propagates between said reflective surface and said reflective polarizer one or more time before being transmitted by said reflective polarizer.

9. The LCD display backlight system of claim 1, wherein said reflective polarizer is integrated with a diffuser.

10. The LCD display backlight system of claim 1, wherein said plurality of light sources are cold cathode fluorescent lamps.

11. The LCD display backlight system of claim 1, wherein said plurality of fractional wave plates form a pattern on said reflective surface.

12. The LCD display backlight system of claim 11, wherein said pattern is one of the following: stripes, circles, rings centered around a light source, squares, rectangles, other geometric shapes, random shapes or regular shapes distributed randomly on said reflective surface.

13. The LCD display backlight system of claim 1, wherein each light sources are spaced S apart and said plurality of light sources are thickness T from said reflective polarizer.

14. The LCD display backlight system of claim 13, wherein density and coverage percentage of said fractional wave plates on said reflective surface are optimized based on said spacing S and said thickness T and determines the amount of color mixing with said system.

15. The LCD display backlight system of claim 1, wherein said fractional wave plates fully or partially covers the spaces between said plurality of light sources.

16. The LCD display backlight system of claim 1, wherein said plurality of fractional wave plates comprises quarter wave plates, half wave plates and/or other fractional multiples of a wave.

17. The LCD display backlight system of claim 1, wherein the output of a single pass of light through a fractional wave plate is non-circular.

18. The LCD display backlight system of claim 17, wherein the output of a second pass of light thorough said fractional wave plate is non-orthogonal to the incident light.

19. The LCD display backlight system of claim 18, wherein the output of said second pass of light does not match the polarization of said reflective polarizer and results in only partial transmission.

20. The LCD display backlight system of claim 19, wherein reflected portion of the output of second pass of light not transmitted by said reflective polarizer propagates between said reflective surface and said reflective polarizer one or more times before being transmitted by said reflective polarizer.

21. The LCD display backlight system of claim 1, wherein said plurality of fractional wave plates are not aligned to match the direction of the polarization of said reflective polarizer such that the output of a second pass of light through said plurality of fractional wave plates are non-orthogonal to the incident light.

22. The LCD display backlight system of claim 1, further comprising a LCD panel having four side panels, each side panel comprising one of the following: an array of LEDs or cold cathode fluorescent lamps, a reflective surface, absorptive surface or partially reflective surface.

23. The LCD display backlight system of claim 22, wherein said panel comprising said array of LEDs or cold cathode fluorescent lamps further comprises polarization plates to provide polarized light.

24. The LCD display backlight system of claim 22, further comprising a polarization recovery system or a polarization recycling system.

25. The LCD display backlight system of claim 24, further comprising a polarization beam splitter and a fractional wave plate to provide polarized light output.

26. The LCD display backlight system of claim 22, wherein said panel comprising said array of LEDs or cold cathode fluorescent lamps further comprises an optional reflective surface; and further comprising a reflective polarizer to reflect part of the light back into said side panels comprising said array of LEDs or cold cathode fluorescent lamps to provide a return light and said optional reflective surface reflecting said return light back to said reflective polarizer.

27. A LCD display backlight system, comprising:
a reflective surface;
a plurality of light sources mounted on said reflective surface;
a reflective polarizer for transmitting light having a useable polarization and reflecting back unused polarization of light onto said reflective surface;
a plurality of fractional wave plates located between said reflective polarizer and said reflective surface; and
wherein a portion of said unused polarization of light reflected from said reflective polarizer passes through a fractional wave plate and said reflective surface reflects said portion of said unused polarization of light through said fractional wave plate such that the polarization of said unused polarization of light is changed to useable polarization, thereby recycling said unused polarization of light into useful light.

28. The LCD display backlight system of claim 27, wherein said plurality of fractional wave plates are attached to said reflective polarizer.

* * * * *